United States Patent [19]
Hellman

[11] Patent Number: 4,658,093
[45] Date of Patent: Apr. 14, 1987

[54] SOFTWARE DISTRIBUTION SYSTEM

[76] Inventor: Martin E. Hellman, 730 Alvarado Ct., Stanford, Calif. 94305

[21] Appl. No.: 512,685

[22] Filed: Jul. 11, 1983

[51] Int. Cl.$^4$ .............................................. H04L 9/00
[52] U.S. Cl. ........................................ 380/25; 380/4; 380/30
[58] Field of Search ............... 178/22.08, 22.11, 22.09; 358/86

[56] References Cited

U.S. PATENT DOCUMENTS

| | | | |
|---|---|---|---|
| 3,798,605 | 3/1974 | Feistel | 178/22.08 |
| 4,200,770 | 4/1980 | Hellman et al. | 178/22.11 |
| 4,218,582 | 8/1980 | Hellman et al. | 178/22.11 |
| 4,264,782 | 4/1981 | Konheim | 178/22.08 |
| 4,405,829 | 9/1983 | Rivest et al. | 178/22.11 |
| 4,424,414 | 1/1984 | Hellman et al. | 178/22.11 |
| 4,446,519 | 5/1984 | Thomas | 178/22.08 |
| 4,458,315 | 7/1984 | Uchenick | 178/22.08 |
| 4,465,901 | 8/1984 | Best | 178/22.08 |
| 4,567,512 | 1/1986 | Abraham | 358/86 |

OTHER PUBLICATIONS

"New Directions in Cryptography", by Diffie and Hellman IEEE Transaction on Information Theory, vol. 22 #6, 11/76.
"Multiuser Cryptographic Techniques", by Diffie and Hellman AFIPS-Conference Proceedings, vol. 45, pp. 109-112, 6/8/76.

Primary Examiner—Salvatore Cangialosi
Assistant Examiner—Aaron J. Lewis
Attorney, Agent, or Firm—Flehr, Hohbach, Test, Albritton & Herbert

[57] ABSTRACT

Software (programs, videogames, music, movies, etc.) can be authorized for use a given number of times by a base unit after which the base unit (computer, videogame base unit, record player, videorecorder or videodisk player) cannot use that software until the manufacturer sends an authorization for additional uses to the user's base unit. Authorizations may be sent via telephone line, mail, or whatever form of communication is most suited to the application. Authorizations cannot be reused, for example by recording the telephone authorization signal and replaying it to the base unit. Similarly, authorizations can be made base unit specific, so that an authorization for one base unit cannot be transferred to another base unit. This invention also solves the "software piracy problem" and allows telephone sales of software as additional benefits.

10 Claims, 11 Drawing Figures

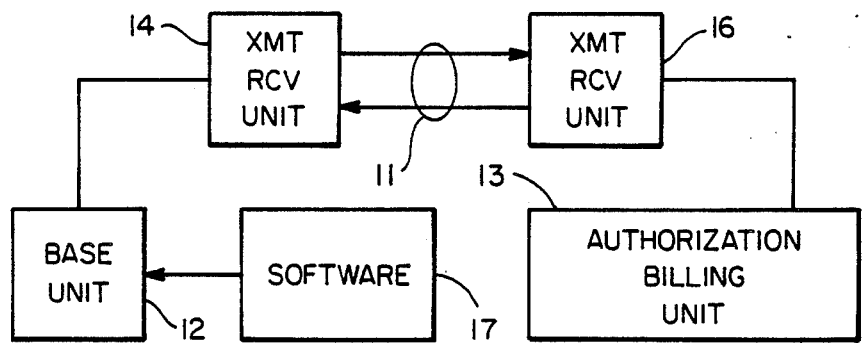
FIG_1
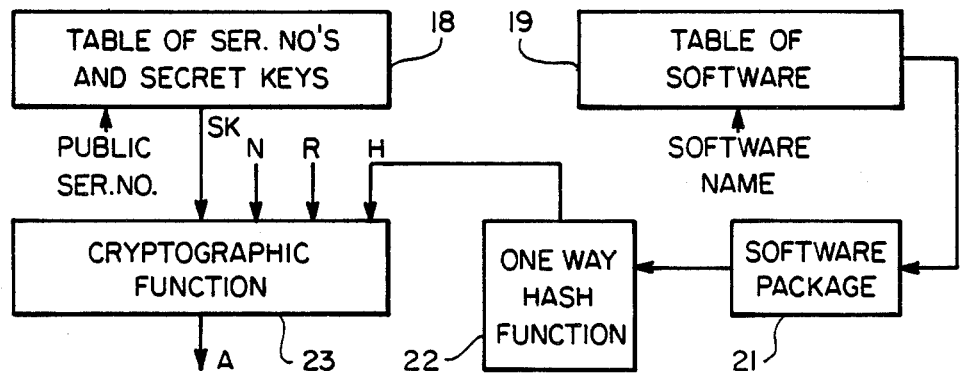
FIG_2
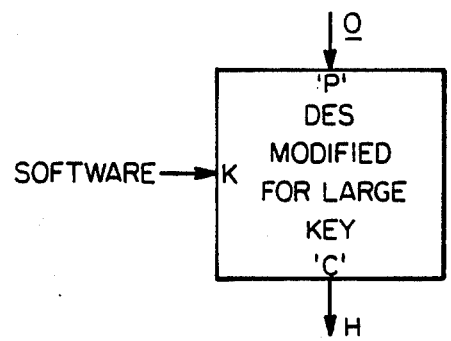
FIG_3

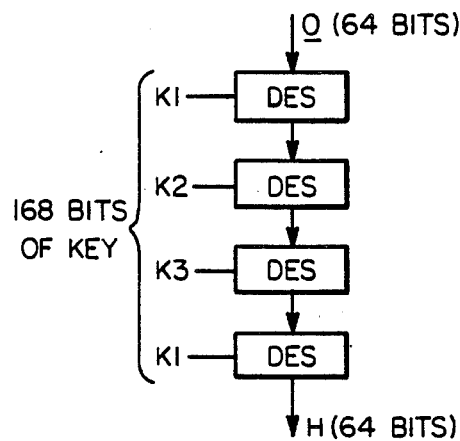
FIG_3A
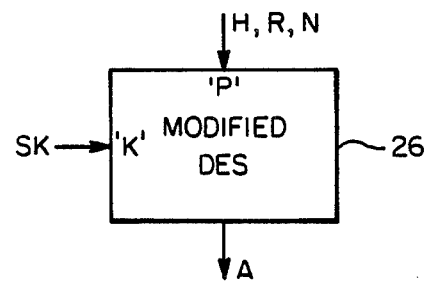
FIG_4
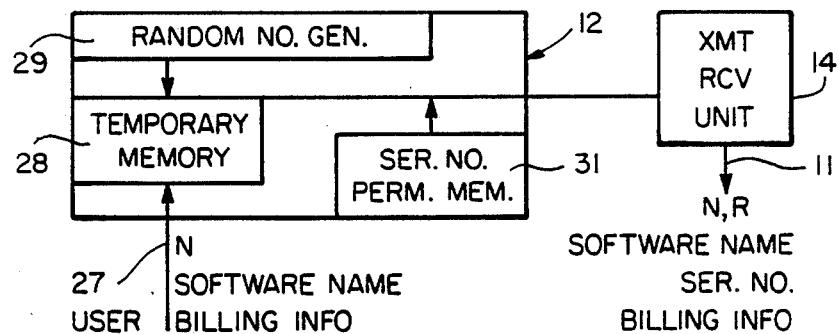
FIG_5

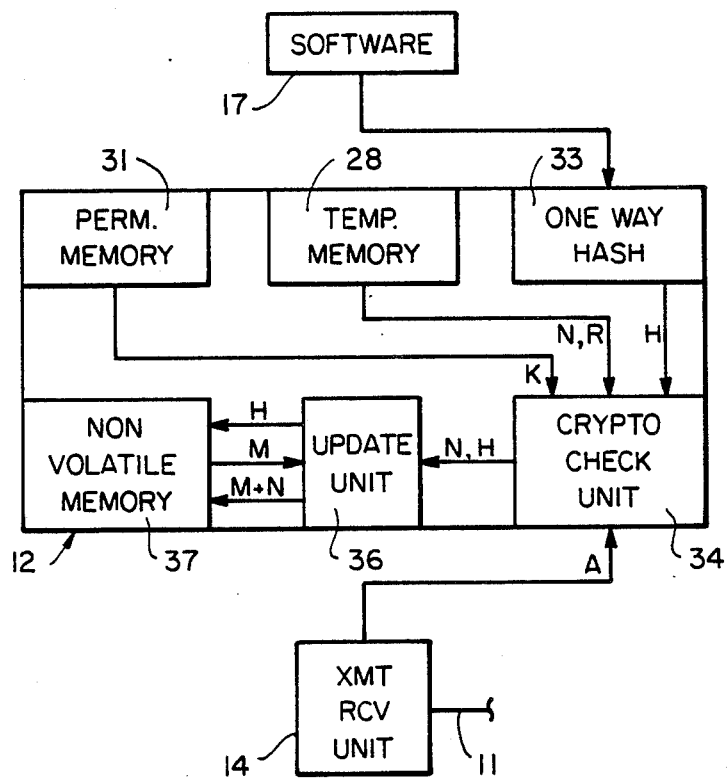
FIG_6
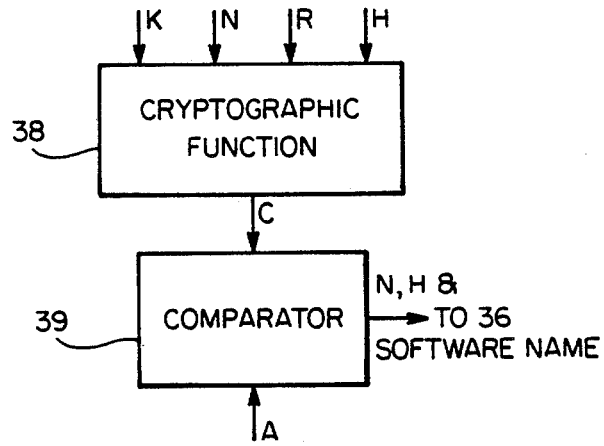
FIG_7

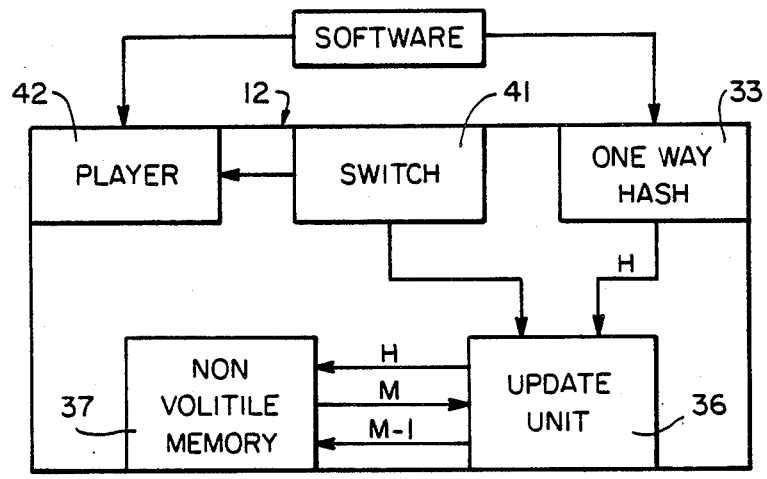
FIG_8
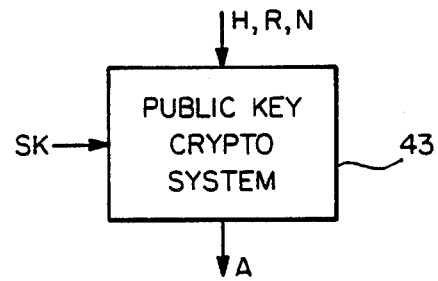
FIG_9
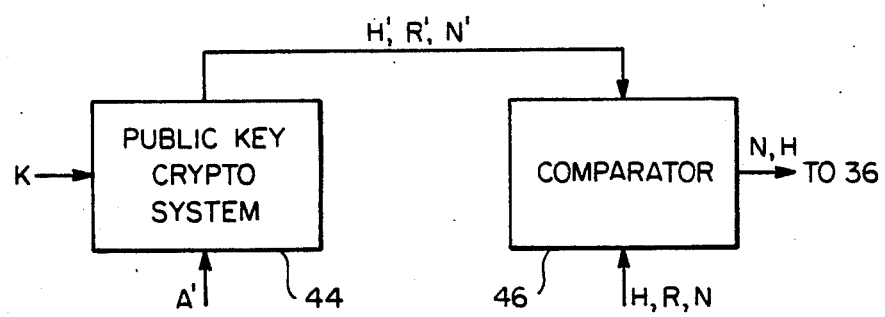
FIG_10

SOFTWARE DISTRIBUTION SYSTEM

The invention relates to a software distribution system and more particularly to a secure software distribution system in which the number of uses of software can be controlled.

Control of software is a major problem in the record, movie (videotape and disk), computer, and videogame industries. In the record industry, illegal home and commercial taping of records is depriving artists, recording studios, and manufacturers of significant income which is rightfully due them. A similar problem exists with illegal taping of movies in the videotape and videodisk industries. So called "software piracy" is a major problem in the computer and videogame industry.

Even if adequate control of software piracy were possible with prior art, so that software sold to one customer could not be copied and used by another customer, it would still be desirable to sell software on a per use basis. Such a system would allow a customer to sample software at low cost and only buy more uses of software which he found interesting or useful.

Current methods of software control address primarily the first issue (piracy or copy protection), and even there, do not provide adequate protection against a dedicated adversary.

Software copy protection does not currenty exist in the record industry.

Videotaped movies are sometimes copy protected by degrading the horizontal or vertical synchronizing signals slightly. A videorecorder requires a cleaner synchronizing signal than a TV receiver, so that the videotaped movie cannot be copied by another videorecorder, but will be displayed properly on a TV receiver. But, the videotape can still be copied by putting a special device between the two videorecorders which cleans up the synchronizing signal.

Copy protection has received greater attention in the computer software industry. One approach is to use a non standard disk format for recording the program of real interest. Standard copying programs can only read or write data in standard format, making copying of this program impossible. A short, machine language program, in standard format, is included as an auxiliary program on the disk. This machine language program tells the computer how to read the non standard format in which the program is recorded. While this approach prevents standard copy programs from copying the disk, an adversary can always make a bit for bit copy of the disk which will be executable by the computer.

Another approach to copy protecting computer programs is to put a small pin hole or other defect at a particular spot on the disk. The program being sold avoids using this ruined portion of the disk, but checks to make sure that that portion of the disk is, in fact, ruined. If it is ruined, the program continues its normal execution. If it is not ruined, then the program stops execution. Even a bit for bit copy of the program onto a new disk will not execute properly because there is hidden "information" on the disk (which part is ruined) which must be copied if the program is to execute properly.

An adversary can overcome this copy protection by one of two methods. First, he can determine which portion of the disk is checked and make sure it is ruined on the copy. Or, he can delete the part of the program which checks for the ruined portion of the disk. This produces a slightly shorter program which does everything of value to the user that the original program did, but this new version of the program can be copied without any special effort and used on all other base units without further modification to the program or the other base unit.

The second problem (pay per use or allowing a customer to preview software before purchasing it) is a more difficult one. It is remotely related to the practice, in the photographic industry, of giving a customer "proofs" of his pictures. The proofs are of poor quality or fade with time, thus allowing the customer to preview his purchase.

At least one software manufacturer uses a related approach to software sales. The manufacturer provides each customer for its program with two versions: the regular version is in a sealed enevelope, and a "degraded" version, which only allow up to 30 records per file. Within a 30 day trial period, the manufacturer allows the customer to return the regular version in its sealed envelope for a refund. This way, the customer can experiment with the degraded version to determine if he wants the full package.

However, there is no copy protection, so that one dishonest customer can make as may copies as he wants of the regular version and give or sell them to acquaintances with similar base units (computers). These acquaintances can in turn give or sell generation copies to their acquaintances, etc.

It would also be desirble for the customer to experiment with the full version of the program because certain characteristics of the program can ony be determined with large data bases with more than 30 records.

Another method for allowing users to preview software is a system called "crypt lock". As an example, a customer might buy a degraded version of a data base management program for a small sum which is limited to a small number of records per file.

If, after using the degraded software, the buyer decides he wants to buy the complete program he calls the manufacturer, gives the serial number of his disk and a credit card number, receives an authorization code from the manufacturer, and uses this code to "unlock" the full power of the software. The full version of the program is really contained on the "degraded" disk, but parts of it are not accessible until certain instructions are changed. This change is made once the right authorization code is entered.

This approach suffers from the same drawbacks as the approach described immediately beforehand: Once the program has been "unlocked" it can be copied at will and the customer can only preview a degraded version of the program.

The prior art in cryptography which is relevant to this application is described in Diffie and Hellman's tutorial paper "Privacy and Authentication: An Introduction to Cryptography", Proceedings of the IEEE, November 1979. The prior art describes one-way functions and cryptographic functions of the type needed as components of the present software control system.

For completeness, three prior art cryptographic functions required to carry out the present invention are described: conventional cryptographic functions or systems, one-way functions, and public key cryptosystems.

A conventional cryptographic function or system can be described by an enciphering and a deciphering function. The enciphering function $E(K,P)=C$ operates on a plaintext (unscrambled message) P with a key K to produce ciphertext (scrambled message) C. The deciphering function D(K,C)=P operates on the ciphertext C thus produced with key K to reproduce the plaintext P. Both E(K,P) and D(K,C) are easily implemented and easily computed.

Such a conventional cryptographic system implicitly defines a third function T(P,C)=K which computes K from knowledge of P and C. T(P,C) is the function a cryptanalyst must implement and compute when he has some matched plaintext and ciphertext. T(P,C) must therefore be difficult to compute—ideally taking millions of years to compute with any imaginable circuitry.

An example of such a conventional cryptographic system is the Data Encryption Standard or DES, described in Federal Information Processing Standard Publication (FIPS PUB) 46 and available from the National Technical Information Service, 5285 Port Royal Road, Sprngfield, VA 22161.

A one-way function is a function which is easy to compute in the forward direction, but hard to compute in the reverse direction. That is, if Y=f(X) is a one-way function then given any X it is easy to compute the corresponding Y, taking typically a fraction of a second on a small computer. But given any Y it is extremely difficult to find the corresponding X, ideally taking millions of years on the most powerful computer imaginable.

A method for deriving a one-way function from a conventional cryptographic system is described in section V of Diffie and Hellman's paper, "New Directions in Cryptography", IEEE Transactions on Cryptography, vol. IT-22, November 1976 (see, especially FIG. 3 therein): A conventional cryptographic enciphering function E(K,P) is used to obtain Y as Y=E(X,PO), where PO is some fixed, publicly known plaintext value. That is, the input X to the one-way function is used as the key, PO is used as the plaintext, and the output Y from the one-way function is taken as the computed ciphertext. Computing Y from X merely involves an encipherment and is therefore a simple computation. But computing X from Y involves cryptanalysis because X=T(PO,Y) and is therefore difficult to compute.

A one-way function can be expansionary (i.e., Y is longer than X), compressive, or neither, depending on the relative sizes of the ciphertext (Y) and key (X). For purposes of this invention, we are primarily concerned with one-way compressive functions, where X is much longer than Y. Typical values herein will be a 100,000 bit length for X and a 100 bit length for Y. A method for generating such an extremely compressive one-way function is described in the patent.

Compressive functions are also called "hash functions" and a one-way compressive function is therefore called a one-way hash function.

The third and last cryptographic entity we shall describe from the prior art is a public key cryptosystem. A public key cryptosystem differs from a conventional cryptographic system in that two different keys are used. One of these keys is a public key PK and the other is a secret key SK.

For purposes of this invention, the public key cryptosystem is used in digital signature mode so that the secret key is used first to obtain the digital signature SIG from the message M by the operation SIG=SK H (M), where H is a one-way hash function of the message.

The recipient of a message M' which is purported to be signed by the signature SIG' must verify the signature. To verify that SIG' is the correct signature for message M', the recipient needs only the public key and not the secret key. Otherwise, he would be able to sign messages as well as authenticate them.

The recipient operates on the received signature SIG' with PK to obtian H'=PK(SIG'). The recipient also operates on M' with the one-way hash function H to obtain a check value C=H(M'). If and only if H'=C does he accept the signature as valid. (Since PK and SK effect inverse operations, if the received message M' equals the original message M and if the signature SIG' was properly generated as SK H(M) then H'=PK SIG'=H(M) and C also will equal H(M).)

Herein, the term "crytpographic function" is used to mean a function that can be implemented either as a conventional cryptographic function, E(K,P) or D(K,C), or as a public key cryptographic function, PK(SIG) or SK(H(M)).

Accordingly, it is an objective of the invention to allow a software manufacturer to control the number of times a piece of software is used by a customer, in a manner such that the authorization cannot be recorded and reused, and such that the authorization is not transferable to another base unit.

Another objective of the invention is to allow the use of software to be sold over the telephone or other similar communication channels, but in a way which prevents recording of the software or authorization signal sent over the channel from being reused on that customer's or another customer's base unit.

Another objective of the invention is to prevent "software piracy." That is the illegal use of software on a base unit which has not paid a license fee.

An illustrated embodiment of the present invention describes a method and apparatus in which use of the software can be authorized for a particular base unit a specific number of times. The illustrated embodiment differs from prior approaches to software control in that no modification to the software will allow the software to be used on all other base units, and in that the software can be used only a specific number of times even on the licensed base unit.

In the present invention, a manufacturer of base units and software generates a random key and stores it in a base unit which is sold to a user. When wishing to use a certain software package, the user's base unit generates a random number and communicates it to the manufacturer of the software. The software manufacturer generates an authenticator which is a cryptographic function of the base unit's key, the software, the number of times use of the software is authorized, and the random number generated by the base unit. The authenticator is communicated to the user's base unit. The user's base unit then uses the same cryptogaphic function to generate a check value of the key, the software, the number of times use is authorized, and the random number which the base unit generated. If the check value and the authenticator agree, the base unit accepts the authenticator as valid and increments the number of times use of that software is authorized.

Additional objects and features of the present invention will appear from the description that follows wherein the preferred embodiments have been set forth in detail in conjunction with the accompanying drawings in which:

FIG. 1 is a block diagram of a pay per use software control system.

FIG. 2 is a block diagram of an authorization and billing unit for generating an authorization for additional software use in the pay per use software control system of FIG. 1.

FIG. 3 is a block diagram of a one-way hash function for performing one-way hashing operations in the authorization and billing unit of FIG. 2, in the base unit during verification of authorization of FIG. 6, and in the base unit during use of software of FIG. 8.

FIG. 3A is a block diagram of a DES modified for the large key used in FIG. 3.

FIG. 4 is a block diagram of a cryptographic function used for generating authorizations in the authorization and billing unit of FIG. 2 and in the cyrptographic checking unit of FIG. 7.

FIG. 5 is a block diagram of a base unit during generation of a request for additional software uses in the pay per use software control system of FIG. 1.

FIG. 6 is a block diagram of a base unit during verifciation of authorization of additional software uses in a pay per use software control system of FIG. 1.

FIG. 7 is a block diagram of a cryptographic checking unit in a base unit during verification of authorization of additional software uses of FIG. 6.

FIG. 8 is a block diagram of a base unit during use of software in a pay per use software control system of FIG. 1.

FIG. 9 is a block diagram of an alternative implementation of a cryptographic function used for generating authorizations in the authorization and billing unit of FIG. 2.

FIG. 10 is a block diagram of an alternative implementation of a cryptographic checking unit in a base unit during verification of authorization of additional software uses of FIG. 6.

Referring to FIG. 1, a pay per use software control system is shown in which communication takes place over an insecure communication channel 11, for example a telephone line. Communication is effected over the insecure channel 11 between the base unit 12 and the authorization and billing unit 13 using transmitter-receiver units 14 and 16, which may be modems such as Bell 201 modems. Transmit-receive units 14 and 16 could be humans conversing over a telephone line. The human at the transmit-receive unit 16 would then type the voice information into a keyboard for entry in the unit 13.

The user at base unit 12 obtains software package 17 by purchasing it at a store, over telephone line, or in some similar manner. The cost for software package 17 can be set low because additional revenue will be obtained by the software manufacturer when issuing additional authorizations for use of the software package.

Base unit 12 generates and communicates to authorization and billing unit 13 a signal representing a user originated request for software use. This request consists of several parts SOFTWARE NAME, SERIAL NUMBER, N, R, and BILLING INFORMATION. SOFTWARE NAME is the name of the software package to be used. SERIAL NUMBER is a serial number, identification number, user name or similar identifier unique to base unit 12. N is the number of additional uses of software requested. R is a random number, counter value, or other non-repeating number generated by the base unit 12. And BILLING INFORMATION is a credit car number or similar means for billing the user for use of the software.

Authorization and billing unit 13 receives the signal representing the user originated request for software use, generates a signal representing an authorizaiton A for that particular base unit 12 to use the software package 17 an additional N times, and communicates the signal representing authorization A to base unit 12.

Base unit 12 receives the signal representing authorization A over insecure channel 11. As will be explained shortly in FIG. 6, base unit 12 then checks whether the authorization is from the software manufacturer and, if the authorization is correct, base unit 12 updates its memory to allow N additional uses of software package 17.

FIG. 2 depicts an implementation of authorization and billing unit 13. Authorization and billing unit 13 contains a memory 18 having a table of serial numbers and secret keys which allows authorization and billing unit 13 to determine a base unit's secret key, SK, from knowledge of the base unit's public serial number. Authorization and billing unit 13 also contains in another portion of the memory or in an additional memory 19 a table of software which allows authorization and billing unit 13 to determine the complete contents of software package 17 from knowledge of the much smaller information SOFTWARE NAME. The software package 21 produced at the authorization and billing unit 13 is an exact replica of software package 17 which is available at base unit 12.

Software package 21 is applied as an input signal to one-way hash function generator 22 to produce an output signal H. This output signal H is used as an "abbreviation" or name for describing the software package 21. To prevent an opponent from modifying one software package so that it has the same abbreviation or name as another software package, one-way hash function generator 22 has the following property: Its output signal, H, is easily commmputed from its input signal, software package 21, but given an H value it is difficult, taking perhaps millions of years, to compute any other software package wich produces this same H value. This property is necessary because any two software packages with the same H value are considered equivalent and therefore have the same authorization A. An authorization to use the cheaper of two software packages with the same H value could also be used as an authorization to use the more expensive of the two. As with any has function, the one-way has function generator 22 has a much shorter output, perhaps 100 bits, than its input, typically 10,000 to 1,000,000 bits in this invention. This allows H to be stored more economically than the software package 17 in the base unit's memory. Storage of H or of the complete software package 17 is desirable to increase the security of the system because storage of only SOFTWARE NAME would allow a dishonest user to rename software packages and pay for uses of less expensive packages when really using more expensive ones. A method for implementing one-way hash function generator 22 is depicted in FIG. 3, which will be explained shortly.

The signal H which is the output of the one-way hash function generator 22 is applied as one of four input signals to cryptographic function generator 23 to produce a signal representing authorization A which is communicated to base unit 12 over channel 11. The other three input signals to generator 23 are R and N which were received over channel 11 from base unit 12 and SK which is obtained from authorization and billing unit's table of serial numbers and secret keys.

Generator 23 has the property that new authorizations cannot be inferred from old authorizations. More precisely, if cryptographic function generator 23 generates a publicly known function and if an opponent has many authorizations 'A(i) which go with different secret keys 'SK(i), hash values 'H(i), random numbers 'R(i), and numbers 'N(i), so long as the secret keys 'SK(i) are kept secret, it is difficult for an opponent to compute a new authorization A' which goes with any SK', N', R', H' for which an authorization has not already been given. Methods and apparatus for implementing cryptographic functions with this property are depicted in FIG. 4 and FIG. 9, which will be explained shortly.

FIG. 3 depicts an implementation of the one-way hash function generator 22. As explained by W. Diffie and M. Hellman in section V of their paper "New Directions in Cryptography" (IEEE Transactions on Information Theory, November 1976) a one-way function from a value X to a value Y can be generated from a conventional cryptographic system by fixing the plaintext at some value, for example all binary 0's, applying X to the key port, and taking Y as the ciphertext computed from this plaintext and key. Computing Y from X is computationally simple because only an encryption is involved. But computing X from Y is equivalent to cryptanalysis, and is thus difficult if the cryptographic system is secure.

In order to make the one-way hash function generator 22 in this manner, one needs a cryptographic system with a much larger key, typically 10,000 to 1,000,000 bits, than ciphertext, typically 100 bits in this invention. The Data Encryption Standard (DES), described in Federal Information Processing Standard 46, is typical of a conventional cryptographic system. While the DES has a shorter key (56 bits) than ciphertext (64 bits), DES can easily be changed to a DES modified for a larger key which then has the desired property.

FIG. 3A depicts the simplest way to implement a DES modified for a large key. In this figure, the plaintext P is enciphered four times with the normal DES to produce a ciphertext C. te four keys used are K1, K2, K3 and K1, so that one key, K1, is repeated. The three independent keys used have a total length of 3×56=168 bits, but the plaintext and ciphertext lengths are unchanged at 64 bits. Hence the modified DES has a key length of 168 bits and a ciphertext of 64 bits.

K1 is repeated to strengthen security. Ideally, each key would be repeated several times. The same basic DES circuitry can be used iteratively, rather than replicated, so that the cost of the circuitry shown in FIG. 3A need not be much greater than that for a basic DES.

An alternative, and usually more efficient way of producing a DES modified for a large key would be to increase the number of iterations or rounds in DES. Since 48 bits of key come into play in each DES iteration, a 1,000 iteration DES would use 48,000 bits of key yet still have only a 64 bit ciphertext. For cryptographic security it is necessary that each bit of key be used several times, so at least a 3,000 round DES would be desirable for compressing 48,000 bits of software package into 64 bits of hash value H. the ciphertext size of DES is also easily increased if, for example, a 100 bit hash value H is needed instead of a 64 bit value.

While DES is used here for illustrative purposes, many other methods and apparatus for generating a one-way hash function are known to exist. DES encryption is very slow on a general purpose signal processor such as a microprocessor. Thus, if the signal processing in the base unit 12 or authorization and billing unit 13 is done primarily with a microprocessor then a one-way hash function generator 22 which is computed more rapidly on a microprocessor would be desirable. Since it is mostly DES's mixing operation, a permutation or tranposition on 32 bits, which makes DES slow on a microprocessor, replacement of the mixing operation by one more suited to a microprocessor would be desirable.

One implemenation of the cryptographic function generator 23 of FIG. 2 would also involve a one-way hash function as depicted in FIG. 3, except H, R and N together, instead of the software package, would be the input to the one-way hash function and the authorization A, instead of H, would be the output. This implementation would have the required property that new authorizations could not be predicted from the property that given an output valve, it is difficult to find the corresponding input value to the one-way function.

FIG. 4 depicts an alternative implementation of the cryptographic function generator 23. A modified DES 26 would have the secret key SK as input to its key port and H, R and N would be the input to the plaintext port. The authorization A would be obtained as the output of the ciphertext port. The DES would have to be modified, in the manner described above, to have its key length equal to the length of SK.

In addition, the modified DES's plaintext length would have to be equal to the total length of H, R and N and its ciphertext length would have to be equal to the length of A. Usually the plaintext and ciphertext are the same length, but for our purposes any portion of the ciphertext could serve as A. So if the length of A is shorter than the combined lengths of H, R and N then the modified DES 26 could have its plaintext and ciphertext length equal to the combined lengths of H, R and N and the ciphertext could be truncated to generate A. Similarly, if the lengths of A is greater than the combined lengths of H, R and N then the plaintext and ciphertext length of modified DES 26 could be equal to the length of A and the plaintext could be padded out with binary 0's to make the proper size input.

This alternative implemenation would also inherently have the property that new authorizations could not be predicted from old authorizations because, in a conventional cryptographic system, given past plaintext-ciphertext pairs, it must be difficult to determine the plaintext which goes with a new ciphertext.

For ease of understanding, the implementation of the base unit 12 is shown in three figures, corresponding to its three phases of operation: when a user generates a request for use of a software package; when the base unit verifies the validity of the received authorization; and when a user later uses the software package. Only those elements of the base unit 12 which are needed in a particular phase are shown in the corresponding figure.

FIG. 5 depicts the operation of the base unit 12 during generation of a request for software use. A user 27 communicates signals representing SOFTWARE NAME, BILLING INFORMATION and N, the number of additional uses desired, to the base unit 12, for example by typing them into a keyboard which is part of base unit. Base unit 12 stores these values in a temporary memory 28, for example a RAM, so that they can be used later when verifying the validity of the received authorization for additional software use. A random number generator 29 (e.g. a noisy operational amplifier with hard quantization) generates a signal representing a random number R which is also stored in temporary memory 28 for later use during verification of the received authorization. The base unit's serial number is stored in a permanent memory 31, for example a PROM which was burned in during manufacture of the base unit. Signals representing the four quantities stored in temporary memory 28, N, R, SOFTWARE NAME and BILLING INFORMATION, and the serial number stored in permanent memory 31 are communcicated over channel 11 by the base unit transmit-receive unit 14.

FIG. 6 depicts the operation of the base unit 12 during verification of an authorization A to use a software package an additional number of times. The base unit does not use the software package during this phase, but is updating its memory so that the software package can be used later. Input signals during this phase of operation are the software package and authorization A from transmit-receive unit 14. A signal representing software package 17 is applied as input to a one-way hash function generator 33 of the base unit which is functionally the same as the one-way has function generator 22. FIGS. 3 and 3A therefore each depict an implementation of one-way function generator 33.

As depicted in FIG. 6, the base unit 12 has a base unit key, K, stored in a permanent memory 31, for example a PROM which is burned in during manufacture of the base unit. While we will later generalize the implementation to situations where the base unit key, K, and the secret key SK, used by the authorization and billing unit are different, for the moment we treat the case where K and SK are equal to one another. In that case K must be stored in a secure memory, inaccessible to the user. For, if the user can learn K, in this case he has learned SK, and he can generate authorizations to himself to use any software package without paying for its use.

However, it is important to note that because no two users share the same secret key, if a small percentage of users go to the trouble of learning their secret keys, it will not allow any other user to avoid payment for use of software.

Encapsulating the base unit permanent memory 31 in epoxy or other means can be used to deter all but a very small percentage of users from learning their secret keys.

The output signal H of one-way hash function generator 33, the authorization signal A, signals representing the values N and R stored in temporary memory 28, and the base unit key, K, are input to a cryptographic check unit 34. In a manner to be described shortly, the cryptographic check unit 34 determines if the authorization A is valid for the software package 17 being presented to the base unit 12 for the current authorization request. The random number R varies from request to request, so that replay of an old authorization will not be accepted as valid unless the two R values are the same. By making R 50 bits long, for example, there is only one chance in $10^{15}$ that an R value will be repeated in a new request.

If the cryptographic check unit 34 determines that the authorization A is valid, it applies signals representing N and H to an update unit 36. Because different software packages have different H values, H can be used in place of SOFTWARE NAME to name the software being used. Update unit 36 applies to interrogatory signal representing H to a non-volatile memory 37, for example an EEPROM or a CMOS memory with battery backup. The non-volatile memory 37 applies a signal to the update unit 36, said signal representing M, the number of authorized uses of the software package with hash value H which still remain unused prior to this new authorization. The update unit 36 adds M and N and applies a signal representing M+N to the non-volatile memory 37, so that M+N replaces the old number M in the non-volatile memory 37 as the number of uses of the software package which have been paid for.

FIG. 7 depicts an implementation of the cryptographic check unit 34. Signals representing K, N, R, and H are applied as inputs to a cryptographic function generator 38 which generates a check value C as an output signal. Signals C and A are input to a comparator 39. If each bit of C matches the corresponding bit of A then the comparator 39 and the cryptographic check unit 34 generate a signal which indicates that A is to be considered a proper authorization and that the update unit 36 is to add N authorized uses to the software package with hash value H. If even one bit of C differs from the corresponding bit of A then A is not considered to be a proper authorization.

In FIG. 7, the cryptographic function generator 38 which is part of the base unit 12 is functionally identical with the cryptographic function 23 which is part of the authorization and billing unit 13. FIG. 4 therefore depicts an implementation of the cryptographic function 38.

FIG. 8 depicts an implementation of the base unit 12 during use of a software package. Software package 17 is connected to the base unit 12 and a signal representing said software package is operated on by the one-way hash function generator 33 to produce an output signal which represents the hash value H. The signal H is transmitted to update unit 36 to indicate which software package is being used. Update unit 36 uses H as an address to non-volatile memory 37, which responds with a signal representing M, the number of uses of software package 17 which are still available.

If M is greater than 0 then update unit 36 sends a control signal to switch 41 which activates software player 42, allowing it to use software package 17. Update unit 36 also decrements M to M−1 and stores this as the new value in address H in non-volatile memory 37.

If, instead, M=0 then update unit 36 does not change the contents of the non-volatile memory 37, but neither does it send a control signal to activate software player 42. The user is thus prevented from using software for which he does not have current authorized use.

It is also possible to sell unlimited number of uses of a software package, by reserving one vlaue of M to represent infinity. For example,if an 8 bit number is used to represent M then any value of M from 0 to 255 can be represented, or the all 1's pattern, which normally represents 255, can be reserved to represent infinity. Then all integer values of M between 0 and 254 and the additional value, infinity, can be represented. The update unit 36 would be designed to recognize this special pattern of all 1's and not change it when the software package was used.

Software player 42 will vary from application to application. For example, if the software is recorded music then software player 42 would be a record player;

if the software is a computer program, then software player 42 would be a microprocessor or central processing unit (CPU).

Base unit 12 should be physically constructed so that switch 41 is not readily accessible to the user. Otherwise a user could cut the wire sending the control signal from update unit 36 to software player 42 and force the control signal to always activate software player 42. The use of epoxy to encapsulate switch 41 and the wire connecting it to update unit 36 would be one such approach. It may suffice only to detect if a base unit 12 has been tampered with if the user signs a license agreement which says he will not open the base unit. Detection of tampering is a simpler task and techniques are well known for accomplishing this task. For example, many warranties are void if equipment is opened by the user. Manufacturers of such equipment use special factory seals or a dab of paint across a joint to tell if a piece of equipment has been opened.

Up to this point, it has been assumed that the secret key, SK, of FIG. 2 and the base unit key, K, of FIGS. 6 and 7 are identical. It is possible to use alternative implemenations of the cryptographic function 23 and the cryptographic check unit 34 in which SK and K are different. Public key cryptosystems have two different keys, one of which can be made public while the other is kept secret. U.S. Pat. No. 4,218,582 "Public Key Cryptographic Apparatus and Method" describes such a system. The use of such a public key cryptosystem has the advantage of allowing all users to have the same base unit key in memory 31 and the same secret key SK, which would be the public key. The table of serial numbers and secret keys in memory 19, in FIG. 2, can then be eliminated. One secret key value, SK, would suffice for all base units because, even if one user opens is base unit to learn his base unit key, it no longer tells him the secret key for any of the other users because it is their public key. He would thus be unable to generate valid authorizations for software use by any other user, and in fact, could not even generate valid authoirzations for his own use of the software.

This alternative implemenation of cryptographic function generator is depicted in FIG. 9. Signals representing H, R and N are presented as a message to be signed by a public key cryptosystem 43 using secret key SK to produce the digital signature. The digital signature thus produced becomes the authorization A.

The corresponding alternative implemenation of cryptographic check unit 34 is depicted in FIG. 10. The base unit's (public) key, K, is used as the verification key in public key cryptosystem 44 used by the base unit 12 to verifyt that authorization A' is equal to its correct value A for authorizing N additional uses of software package with hash value H when R was the random number generated by the base unit. The H', R' and N' values produced as the output signals by public key cryptosystem 44 are applied as input signals to comparator 46 which also is given the correct H, R and N values. If the two sets match exactly, the authorization A' is deemed authentic. If even one bit of the two sets differs, A is deemed inauthentic.

If H, R and N are larger than the message size which can be signed by public key cryptosystem 43 of FIG. 9, then a one-way hash function of H, R, and N can be used as input signal to public key cryptosystem 43 instead. In that case, comparator 46 of FIG. 10 would be given the hashed value of H, R and N to compare with the output of public key cryptosystem 44.

Up to this point, it has been assumed that authentication of the source of requests is not required. However, it may be necessary to protect against one individual requesting software uses to be billed to another individual's account. Note that the authorization would be of no use to the first individual since authorizations are base unit specific. Rather, the first individual's action would be intended solely to disrupt proper billing of other users.

If such authentication of the source of requests is desired, then request for additional software uses could be modified to authenticate the source of the request. This could be done by changing R in the request for additional software uses to $R'' = E(K, R*0)$, the result of enciphering plaintext $R*0$ under key K. $R*0$ represents R followed by some number, p, of binary zeroes. As before, K is a base unit key, stored in the permanent memory 31.

The authorization and billing unit would verify the request as authentic by deciphering $R''$ under K (obtained from its table of serial numbers and secret keys) and checking that p binary zeroes result in the last p bits. The probability of an inauthentic request appearing authentic is $2^{-p}$, so if $p=20$ there is only one chance in a million of fooling the system.

Although the invention has been described in accordance with one embodiment, it is to be understood that the present invention contemplates other embodiments compatible with the teachings herein. For example, N, the number of additional software uses authorized at each request, could be a constant. In that case, N would be deleted from the request for additional software uses, as an input to cryptographic function 23, etc. The fixed value of N would only have to be stored in update unit 36.

Similarly, if all software packages cost the same per use, there would be no need to include SOFTWARE NAME in the request for additional software uses. In that case several simplifications are possible. A single number, representing the total number of authorized software uses remaining, could be stored in non-volatile memory 37, rather than storing the number of uses remaining for each software package. In FIG. 2, the memory 19 for storing the table of software and the one-way hash function 22 could be deleted. The one-way hash function 33 could be deleted from FIG. 6 and 8. And, in FIGS. 7 and 9, the output of comparator 39 or comparator 46 could be N, rather than N and H.

What is claimed is:

1. A system for secure distribution of software comprising in combination:
   - a base unit which uses the software;
   - a remote authorization unit which authorizes the use of the software in the base unit;
   - means providing communication between the base unit and the authorization unit;
   - means in said base unit for inhibiting use of the software unless authorization for use has been received from the authorization unit;
   - means in said base unit for communicating software requests to the authorization unit, said request including at least identification of the base unit, the number of uses requested and a random or non-repeating number;
   - means in said authorization unit for processing siad request including identification of the base unit the number of uses requested, and the random number and providing an authorization for the requested number of uses;

means in said base unit for receiving, and verifying the authorization; and means in said base unit permitting use of the software for the number of uses authorized by the authorization unit.

2. A system as in claim 1 wherein the means for communicating software request additionally communicates the name of the software and the authorization unit authorizes the requested number of uses of the named software.

3. A system as in claim 1 wherein said base unit includes means for storing the number of authorized uses remaining and for incrementing the number of uses responsive to authorization.

4. A system as in claim 2 wherein said base unit includes means for storing the number of authorized uses remaining for each named software and for incrementing the number of uses of named software responsive to authorization.

5. A system as in claim 1 in which the authorization is encrypted.

6. A system as in claim 5 in which the encryption is a public key encryption.

7. A system as in claim 1 in which the remote authorization unit includes means for authenticating requests from the base unit.

8. A system as in claim 5 in which the remote authorization unit includes means for authenticating requests from the base unit.

9. A system as in claim 1 in which said base unit includes means for requesting a number of uses of each of a plurality of named software and for permitting only the authorized number of uses of each of said plurality of named software.

10. A system as in claim 1 in which said request identifies the base unit and said authorization unit verifies the authenticity of the base unit prior to providing authorization.

* * * * *